April 10, 1951 H. S. MARSH 2,547,955

VECTORIAL AND MATHEMATICAL CALCULATOR

Filed March 26, 1946 2 Sheets-Sheet 1

INVENTOR

Hallock S. Marsh

April 10, 1951 H. S. MARSH 2,547,955
VECTORIAL AND MATHEMATICAL CALCULATOR
Filed March 26, 1946 2 Sheets-Sheet 2

INVENTOR.
HALLOCK S. MARSH
BY William D. Hall.
Attorney

Patented Apr. 10, 1951

2,547,955

UNITED STATES PATENT OFFICE 2,547,955

VECTORIAL AND MATHEMATICAL CALCULATOR

Hallock S. Marsh, Philadelphia, Pa.

Application March 26, 1946, Serial No. 657,318

4 Claims. (Cl. 33—76)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to manually operated mathematical computers for solving mathematical and complex algebraic or vectorial problems, without requiring special scales for these functions.

A commonly used manual computing device is known as the logarithmic slide rule. It is capable of providing solutions to problems in arithmetical multiplication and division; derivation of roots and powers; determination of trigonometrical evaluations; multiplication and division of vectors; and the resultants of complex algebraic computations. However, it has the disadvantage of requiring the remembering of complicated formulas and also of requiring the visual reading and recording by pencil of results of partial answers for use in subsequent steps of a given operation. In addition different parts of the logarithmic scales permit different degrees of accuracy in reading results. An even more serious objection is the necessity for several operations or settings to attain results that are attainable with one operation or setting, by use of the present invention.

It is an object of this invention to provide a new and improved computing implement that will avoid one or more of the disadvantages and limitations of instruments used for a similar purpose in the prior art, and permit appreciably greater scale accuracy than obtainable with a similar size of scale members in comparable computers.

An additional object of the present invention is to provide a new and improved computer that can perform the operations of multiplication, division, finding roots, powers, trigonometrical solutions, vectorizing in various ways and other mathematical processes, in an effective and convenient manner, requiring a minimum of mathematical training or understanding on the part of the user.

For a better understanding of the invention, reference is made to the appended drawings and following description, illustrating a general structure and operation of an appliance involving its principles, while the scope and spirit of the invention is particularly pointed out in the claims.

In the drawings—

Figure 1 is a general perspective view of a calculator embodying this invention, Figure 2 is a detail of the pivot mechanism used in the structure shown in Figure 1, Figure 3 is a diagrammatic outline of the calculator being employed for multiplication and division (6×7), Figure 4 is a diagrammatic outline of the calculator being employed for multiplication and division (6×7) using another method, Figure 5 is a diagrammatic outline of the calculator being employed for multiplication and division (6÷2) in the areas adjacent to the pivot, Figure 6 is a similar diagram for finding ($7^2$) or roots of a number, Figure 7 is a diagram for calculating trigonometrical values (sin., cos., tan.), Figure 8 is a diagram for converting polar to rectangular vectorial coordinates, or the reverse, Figure 9 is a diagram of another method for polar to rectangular vectorial coordinate conversions, Figure 10 is a diagram showing a first step in adding two angles on the upper scale, Figure 11 is the second step in such an addition, Figure 12 is a diagram indicating a first step in an alternate method of adding or subtracting angles on lower scale, Figure 13 is a second step in this alternate method of angular addition or subtraction.

Like reference characters pertain to like parts throughout the drawings.

Figures 1, 2:
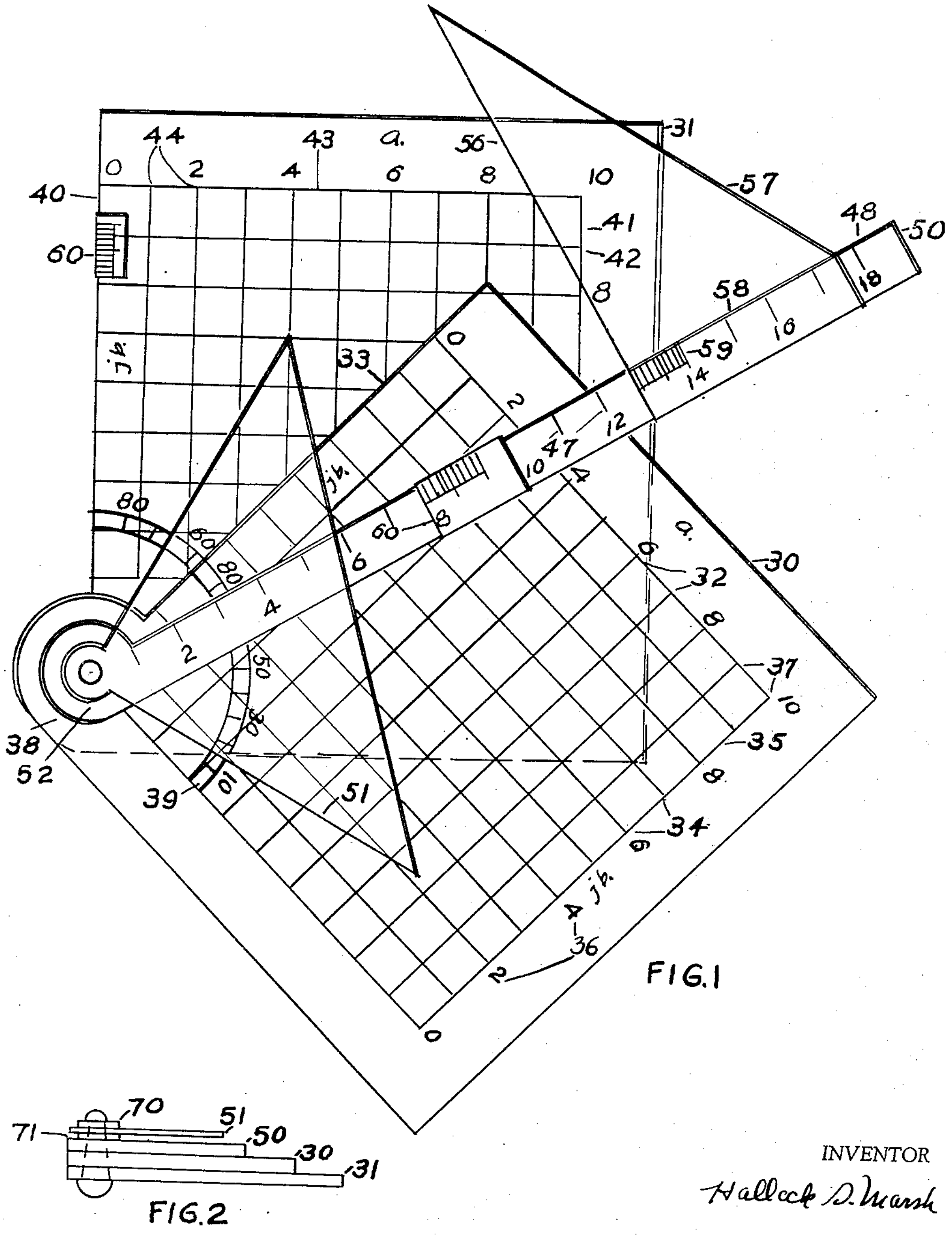

Referring especially to Figure 1, wherein is shown the structural composition of a manually operated computing implement, the implement comprises primarily, a pair of flat cross-sectioned rectangular plates 30 and 31 respectively of plastic, cardboard, metal or other suitable material, that is relatively thin, strong, moderately flexible and capable of being legibly marked or printed on to designate the computing characteristics of the device. The plate 30 is termed the upper plate, while plate 31 is termed the lower plate. The characters marked on the plates are arithmetical indicia, and rectangular coordinates. The ordinates 37, designated by indicia 32 on the plate 30, are parallel to the straight edge 33 of the plate 30 and cross the plate from the top edge to the bottom edge of the coordinate system of markings. From the straight edge 33, abscissa lines 34 are projected at right angles to ordinate lines 37 and cross the plate to ordinate 35. The top and bottom abscissae are designated the "*a*" base lines. Right and left ordinates are designated the "*jb*" base lines. The graduations 36 designate abscissae 34. The abscissae 34 and ordinates 37 form a cross-sectioned picture similar to that printed on conventional, rectangular coordinate plotting charts. On the "*jb*" base line, the graduations are printed 0, 2, 4, 6, 8 and 10 with subdivision abscissae in between to permit reading in between to decimal values. Likewise, the "a" edge is graduated and printed 0, 2, 4, 6, 8 and 10, with the ordinates 37 developed therefrom.

The upper plate 30 has its corner portion 38 enlarged and apertured to form a pivot center on which to rotate it. A stationary protractor scale 39, marked from 0° to 90° in angular measure is printed about this corner and is of sufficient size to make it easily used and read. The plates are preferably of white polished surfaces with the markings in black or red or a combination thereof. Their computative faces are termed their operating planes, as a matter of identification.

The lower plate 31 is similar in form, size, graduations and markings and rotates about the same pivot center. Its "jb" edge is designated 41; the radial edge 40; abscissae lines 42, its "a" edge 43 and the ordinates 44. Likewise, its enlarged pivot corner is designated 45 and its protractor 46. The plate 31 is the foundation and is surmounted by the plate 30, slidable across it in arcuate manner. A rotary magnitude scale 50 which is preferably of rectangular form and narrow width extends from its enlarged pivot corner across and rotates about both plates 30 and 31. It is marked and spaced with graduations 47 similar to those used on the plate edges, that is, 2, 4, 6, 8, and 10. The scale is of similar material to that of the plates, its edge 48 is used as a straight edge for alignment with the markings on the plates during the process of computing.

An angular scale 51, preferably of transparent plastic, having an alignment edge 49 without graduations, is likewise enlarged at one corner 52 and pivoted at the pivot center to rotatably slide over the plates 30 and 31, and coordinate with the markings thereon for computing purposes. This scale is not necessarily marked with graduations, but may have its radial edges at an angle of 45° for ease in mechanical operations. The plates 30 and 31 and scales 50 and 51 revolve about the same common pivot center and are held together by the use of a grommet or rivet as indicated in the drawings, although a conical form of perforation with corresponding conical pivot member and a spring member 70 is preferable as allowing means to minimize lateral displacement due to wear. Friction or spring washers 71 or similar means are used to prevent relative displacement of the members as desired, during rotation. The scale 51 is known as the angular arm. The pivot portions of all the previously mentioned parts are enlarged and apertured to facilitate their common attachment by means of the grommet or rivet or other pivot member.

The magnitude scale 50 has a right angled triangular slider 57 of transparent plastic, clipped and mounted so it can travel longitudinally along on the graduated edge of the magnitude scale at right angles to the magnitude scale, but is easily removable. Its perpendicular side generally faces toward the pivot center and the hypotenuse 57 away from same. It rides on the base 58 which may also have a vernier 59 on it. In addition, a marker 60 of rectangular contour as indicated, serves as a vernier slidable on the same scale 50 on the edge generally used to register the angular values. Other similar markers 60 of vernier character may be provided on other edges as noted.

Various computations and calculations can be made on the implement by the proper manipulations of the plates and arms in coordination with each other. Some of the principal computations made for conventional requirements are illustrated in the following description of operation in connection with the various diagrams concerned. Additional computative processes will occur to the user familiar with the mathematical principles involved.

Examples are briefly detailed in the following paragraphs.

By mastering five simple steps in the operation of this calculator, the student, engineer, or physicist is enabled to find fast, accurate graphic solutions of most complex vectorial problems without the necessity of recalling complex formulas or constants.

The fundamental operations shown below are few and simple; by application of common sense they may be extended to cover practically any vectorial or similar problem. Decimal places may be determined by inspection, as with the logarithmic slide rule.

While accuracy of one part in one hundred is sufficient for many engineering applications, an accuracy of one part in one thousand may be obtained generally by careful manipulation of the calculator.

1. *Multiplication and division*

Figures 3, 4, 5, 6, 7, 8, 9, 10, 11, 12, 13, 14, 15, 16, 17, 18, 19, 20:
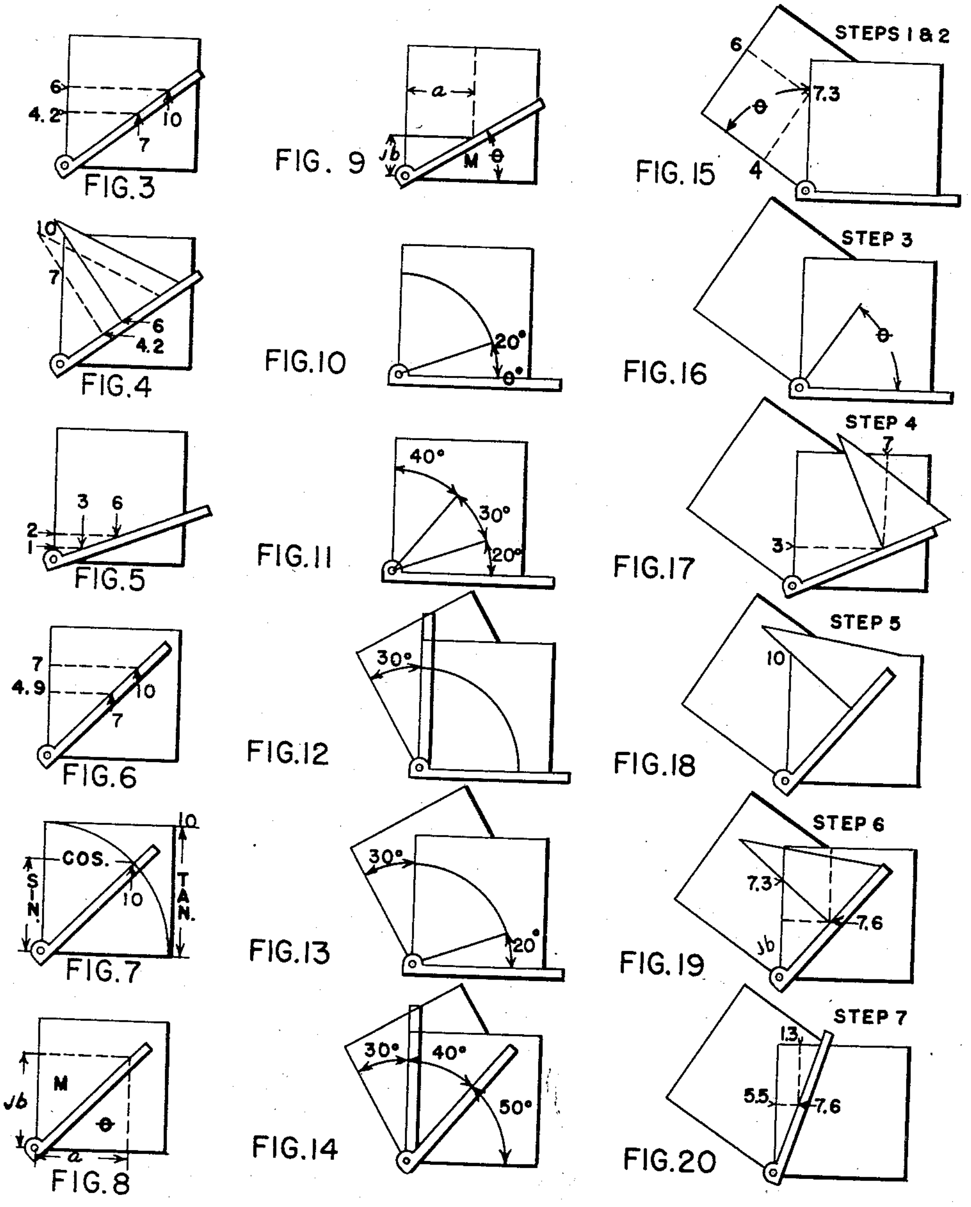
Figure 14 is a final step in this alternate method.
Figures 15 to 20 are diagrams illustrating a combination of the angular addition and scalar multiplication methods shown above in the steps employed in a numerical example for multiplication or division of vectorial quantities by the use of this invention.

A first method of multiplication and division:

*To multiply* one number by another, one rotary arm is rotated until its "10" index is opposite to (parallel with) the first number (multiplier) on the desired plate "jb" scale, as shown in Fig. 3, for the case $6\times7=42$. The product is read on the "jb" scale, opposite the second number (multiplicand) on the arm. This product is multiplied by 10 to compensate for the mechanical decimation applied.

*To divide* one number by another, steps of the above operation are merely reversed. The "10" index of the rotary magnitude arm is placed opposite the divisor number on the plate "jb" scale, and the dividend is read on the rotary magnitude arm, opposite the number to be divided (multiplied by one tenth) on the plate "jb" scale. This operation is also shown in Fig. 3.

A second method of multiplication and division:

Another more accurate method of multiplication is to use a straight-edge or triangle at right angles to the rotary magnitude arm, and slidable along its length, to establish parallel lines connecting the desired values on the rotary magnitude arm and plate scales. This is shown in Fig. 4 for the case $6\times7=42$.

*To multiply* by this method, the normal edge of the straight edge or triangle is held at right angles to, and opposite, the first number (multiplier) on the rotary magnitude arm 50, and the rotary magnitude arm 50 is rotated until the edge of the straight edge 56 crosses the plate scale 33 at its "10" index. The triangular slider 57, Fig. 1 is now slid along the rotary magnitude arm 50 (being careful not to change the angle between the rotary magnitude arm 50 and fixed scale) to intersect the multiplicand on the plate scale 33. The product (divided by 10) is found opposite the straight edge reference line 56 on the rotary magnitude arm 50 and multiplied by 10, mentally.

*To divide* by this method, steps of the previous operation are reversed, as shown by Fig. 4. The straight edge 56 is held at right angles to, and opposite, the divisor on the rotary magnitude arm 50, and the rotary magnitude arm 50 rotated until the straight edge 56, Fig. 1, intersects the "10" index on the plate scale 33. The triangular slider 57 is now slid along the rotary magnitude arm 50 until opposite the number to be divided, on the rotary magnitude arm 50, and the answer read at the intersection of the plate scale 33 and triangular slider 57.

*Where numbers* with widely differing decimal places are used, the "1" index instead of the "10" index of either scale may be used, to secure more accurate readings, as illustrated in Fig. 5.

2. *Roots and powers*

*The square* of a number is determined by multiplying the number by itself, by either of the methods previously shown. As shown by Fig. 6, the "10" index of the rotary magnitude arm 50 is placed opposite to the number desired to be squared, on the plate "*jb*" scale 33, and the square of the number (divided by 10) is read on the plate scale 33, opposite the number being squared on the rotary magnitude arm 50.

While *the square root* of a a number may be extracted by formula, or by logarithmic means, for most purposes a reversal of the steps shown in squaring above will be preferable. The approximate square root of the number is determined by inspection, and the rotary magnitude arm 50 slowly rotated until the same number may be read simultaneously (*a*) on the plate scale 33, opposite the "10" index on the rotary magnitude arm 50, and (*b*) on the rotary magnitude arm 50 opposite the number whose square root is required, on the plate scale 33.

3. *Trigonometric functions*

*Trigonometric functions* of angles may be found as shown in Fig. 7. The *sine* of angle $\theta$ may be read on the vertical plate scale 33, opposite the "10" index on the rotary magnitude arm 50, when the rotary magnitude arm 50 is set to angle $\theta$ on the protractor scale 39.

The *cosine* of angle $\theta$ may be read on the horizontal plate scale 36, opposite the "10" index on the rotary magnitude arm 50, when the rotary magnitude arm 50, Fig. 1, is set to angle $\theta$ as above.

The *tangent* of angle $\theta$ may be read on the vertical plate scale 33, opposite the intersection of the rotary magnitude arm 50, with the 10 line of the vertical scale 35 for angles under 45°. For angles over 45° the tangent is read, similarly, on the 1 line of the vertical scale.

The *secant, cosecant* and *cotangent* may be found by using the reciprocal relations, usually employed, or read directly.

To *multiply*, or *divide* a number other than 10 by the trigonometric function of an angle, it is merely necessary to use the absolute value of the number, in place of the index "10," in the operations above shown.

4. *Vectors*

A vector quantity has two dimensions, angle and magnitude. It may be expressed either in *polar coordinates* (stating its angle and magnitude), written $M/\theta$, or in *rectangular coordinates* (stating the lengths of the base and side of a right triangle whose hypotenuse the polar vector is, written $a+jb$). The operator $j$ implies a rotation counterclockwise of 90°. These elements are shown in Figs. 8 and 9.

For most operations except addition or subtraction, the polar form is preferable.

To *convert a rectangular vector* or complex quantity of the form $(a+jb)$ to polar coordinates, the quantity "*a*" is located on the horizontal scale 32 and the quantity "*b*" is located on the vertical scale 33 of the plate scale 30. The rotary magnitude arm 50, Fig. 1, is rotated to the point of intersection of these two quantities on the plate scale 30. The magnitude of the polar form of this vector may now be read on the rotary magnitude arm 50, opposite this intersection, and its angle may be read from the protractor scale 39 on the plate 30, Fig. 1, at the point where rotary magnitude arm 50 crosses protractor scale 39.

Conversely, to *convert a polar vector* of the form $M/\theta$ to rectangular coordinates, steps shown above are reversed. The rotary magnitude arm 50 is set to the angle $\theta$, on protractor scale 39, and opposite the magnitude M on the rotary magnitude arm 50 the value "*a*" is read from the horizontal plate scale 36, and the value "*jb*" is read on the vertical plate scale 35.

5. *Combination of angles*

*Angles* may be *added* or subtracted mechanically by use of the rotary magnitude and angular arms 50 and 51 without requiring readings of values on the protractor scale 39 between the initial and final operations.

In Fig. 10, the rotary magnitude arm 50 is set to the first angle, and the angular arm 51 set to 0°. Now the angular arm 51 is advanced to the second angle involved, without changing the angle between the rotary magnitude and angular arms 51 and 50. As shown in Fig. 11, 20° and 30° are added to give a sum of 50°.

To *subtract angles*, the steps above are reversed. The rotary angular and magnitude arms 51 and 50 are set to a separation of 30°, and the angular arm 51 set to 50° on the plate protractor scale 39. The difference, or 20°, is read from the position of the rotary magnitude arm 50. If the angular arm 51, Fig. 1, is now set to coincide with the left edge of the plate scale 33, the rotary magnitude arm 50 will indicate the sum of the two angles, as shown by drawings 10 and 11.

For operations involving the angles of vector quantities, the actual angles need not necessarily be read from a scale, as protractor 39. Locating the rotary arm 50 at the intersection of the "*a*" and "*jb*" quantities will define the angle mechanically. Conversely an angle and magnitude mechanically obtained by manipulation of rectangular or "*a*" and "*jb*" quantities may be converted back to rectangular quantities without actual reading of the polar magnitudes or angles involved or mechanically operated upon.

An *alternate method* of adding or subtracting angles is shown in Figs. 12, 13 and 14. The left edge of the upper plate scale 33 is rotated to a desired angle on the lower plate scale 31, and the angular and rotary magnitude arms 51 and 50 adjusted to coincide with the left edges 33 and 40 of the two plate scales 30 and 31. The angular and rotary magnitude arms 51 and 50 now describe the difference between 90° and the first angle. Next the rotary magnitude arm 50 is moved to coincide with the zero degrees horizontal line of the upper plate scale 30, as shown in Fig. 13. The angular arm 51 is now clamped to the scales 30 and 31, Fig. 1, with the operator's thumb, and the rotary magnitude arm 50 moved to the second desired angle, as shown on protractor scale 39 on the upper plate 30, Fig. 1.

The angle between the angular and rotary magnitude arm 51 and 50 is now equal to 90° minus the sum of the two angles.

*Vectorial operations*

Vectorial operations, using the five steps just shown, can be solved by graphic means more rapidly and with less risk of operational error than if undertaken by formula. As most operations with this calculator are graphic and self-explanatory, any tendency to mis-application of principles will be self-evident and automatically self-correcting.

*Multiplication of vectors*

As polar vector quantities have two dimensions, magnitude and angle, they cannot be directly combined arithmetically. In order to multiply or divide two complex quantities by one another, it is necessary to multiply or divide their magnitudes, and to add or subtract their angles. This is done by simultaneous application of several of the steps already shown. An example is shown in Figs. 15 through 20.

Problem: $(6+j4)(7+j3)=?$ (1) The left edge 33, of the upper plate scale 30 is rotated to intersection of 6, on horizontal scale 43, and 4 on vertical scale 40, Fig. 1, of the lower plate 31, as in Fig. 15.

(2) The angular 51 is set to coincide with the left edge 40 of the lower plate scale 31, Fig. 1, and the rotary magnitude arm 50 is set to coincide with the left edge 33 of the upper plate scale 30, recording 90° minus the angle of the first vector.

(3) The angular and rotary magnitude arms 51 and 50 are rotated (without changing their angular separation), until the rotary magnitude arm 50 coincides with the 0° axis of the upper plate 30, as in Fig. 16.

(4) The angular arm 51 is held clamped to the plate 30 with the operator's thumb, and the rotary magnitude arm 50 is rotated to the intersection of the second pair of rectangular coordinates, in the illustration shown, $7+j3$, on the upper plate 30. This operation has mechanically added the angles of the two vectors involved, and subtracted their sum from 90°.

(5) The marker 60 on the rotary magnitude arm 50 is adjusted so that its upper edge 61 records the magnitude of this second polar vector, and without altering the angle between the rotary arms 51 and 50 the triangular slider 57, placed at right angles to the rotary magnitude arm 50, is slid along the rotary magnitude arm 50 until its edge 56, Fig. 1, meets the edge of the marker 60 at the second magnitude value found. The triangular slider 57 and rotary magnitude arm 50 are now held together and rotated (still without altering the angle between the angular and rotary magnitude arms 49 and 50) until the edge 56 of the triangle 57 intercepts the "10" index of the upper plate scale 33, as shown in Fig. 18.

(6) Without altering the positions of the angular and rotary magnitude arms 51 and 50 or the plates 30 and 31, the triangular slider 57, Fig. 1, is now slid along the edge 48 of the rotary magnitude arm 50, moving the marker 60 on this arm 50, Fig. 1, with it, until the edge 56 of the triangular slider 57, intersects the magnitude value of the first vector, found in step 2 above. By moving the marker 60 on the rotary magnitude arm 50, together with the movement of the triangular slider 57, the product of the two magnitudes has been mechanically determined, and is shown by the position of this marker 60, in Fig. 19.

(7) The triangular slider 57 is now ignored, and the rotary angular and magnitude arms 51 and 50 rotated until the angular arm 51 coincides with the left edge 33 of the upper plate 30, Fig. 1.

The marker 60 and the angular position of the rotary magnitude arm 50 now indicate the magnitude and angle of the complex product of the two vector quantities. By reading the "*a*" and "*jb*" scales 32 and 35 opposite the marker 60 on the rotary magnitude arm 50 (Fig. 1) the rectangular coordinates, in the form $(a+jb)$ may be read directly from the upper plate scale 30 (Fig. 1) with proper adjustment of decimal places, as noted previously, and indicated in Fig. 20.

For division, as in previous illustrations shown, the steps in this process are reversed.

It is to be noted that the operation just illustrated can be completed entirely by reference to the "*a*" and "*jb*" scales, and that intermediate reading of angles involved, on protractor scales 39 and 46, or of magnitudes found on the rotary magnitude arm 50 are not required for such solutions.

For reciprocals, of the form $$\left(\frac{1}{a+jb}\right)$$

the expression is considered to be rewritten as $$\frac{1+jo}{a+jb}$$

and solved as before. The expression $1+jo$ means a vector having a horizontal extension of 1 unit, and a vertical extension of zero units, or, graphically expressed, a horizontal line extending from the zero graduation on the "*jb*" scale 33 for a distance of one unit to the right from the zero graduation on the "*a*" scale 32.

The implement has a number of valuable features, it reduces the solution of complex quantities involved by mechanical placement of the arms and scale in the time required to a small proportion of that needed in the normal arithmetical or algebraic methods. The device can be manufactured economically. It involves few parts relatively. It is compact and can be readily carried in the pocket in ordinary sizes. The operator need not have special training in higher mathematics to be able to use it, but may be of ordinary qualifications. The understanding of its operations and use, is easily acquired without technical training, and such use and results will afford accurate results. At the same time the extent of accuracy may be made greater than is possible in other equipment of about the same physical size.

While there has been described what is at present considered to be a new and improved embodiment of this invention, it will be noted that various changes and modifications may be made thereon without departing from the principles and spirit of the invention, as sought to be defined in the following claims.

What I claim is:

1. In a mechanical calculator, the combination of graduated approximately coplanar and quadrantally shaped plates having a system of protractor and abscissa and ordinate markings thereon, and having certain edges accurately shaped for coordination with other elements of the structure, a graduated and a transparent non-graduated scale means operating in coplanar manner over said plate arrangement in predetermined relation to the markings and values thereof in conjunction with a slideable scale means mounted on said graduated scale means and marker means also slideable on said graduated scale means in conjunction with the mechanical positions of said scale to predetermined graduations on said plate, means for mechanically adjusting and retaining said graduated and non-graduated and slideable scale means in desired angular and linear coordination to facilitate calculations.

2. The combination of at least two approximately rectangular plates, having the approximately angular dimensions of a quadrant of arc, having abscissa and ordinate markings, and bearing protractor markings centered about the common zero markings of said abscissa and ordinate markings, said plates being rotatably arranged in substantially coplanar manner on a common pivot axis centered at the common zero markings of the abscissa and ordinate scales of each plate, each plate having reference edges shaped and accurately trimmed radially in relation to the common pivot axis, along the zero ordinate, to permit the use of the plate edge to indicate values such as the polar magnitude and angle corresponding to the rectangular coordinates of a vector established on another plate, or member, generally beneath it, and to permit the accurate determination of and operation upon vector and other values located in any of the four quadrants of arc by coplanar rotation of the plates and other members, graduated scale means also rotatably mounted on the pivot axis common to said plates, at the zero marking of the scale graduations, and trimmed accurately along a scale edge radial to the common pivot axis, permitting interdependent operations on a plurality of vector values established with regard to said plates and means, a removable and reversible triangular member slidably mounted on said graduated scale means, to permit alignment of a value on said scale means, established by said graduated scale means and plates, with values indicated on other scales and plates, to effect parallel transference of the alignment so established to other sets of values on the scales and plates, transparent marker means slidable on the scale means for recording and mechanically transferring values on said graduated scale means, transparent quadrantal angular means rotatably mounted upon, and having accurately aligned edges radial to, the common pivot axis, and separated from each other by 90 degrees of arc, for indicating angles determined by operation of the plates and scale members, and for transferring said angles from one member to another, and adding and subtracting said angles to and from other angles previously and subsequently determined, and for mechanically adding to and subtracting from given angular values a fixed value of ninety degrees of arc, and for accurately positioning any plate in any desired quadrant of arc with regard to any other plate.

3. In a mechanical calculator, the coaxially rotatable combination of a plurality of superposed scale plates, pivoted at their common point of scale origin, straight edged rotatable scale means operating on said plates in predetermined relation to said plates, pivotal means for mechanically adjusting said rotatable means in angular and rectilinear coordination, protractor means on said plates usable in conjunction with said plates for indicating the values of angular coordination, slidable marker and slidable straight edge means on said scale means for evaluating the arithmetical values of the angular and rectilinear adjustments, said scale means operating over the plates cooperatively therewith, said pivotal means being located at the points of origin of the coordinates of said plates and the zero position of said scale means.

4. A calculator of the class described comprising in combination, a double component chart having its linear markings extending at right angles to each other across the face of the chart, forming intersections, said markings representing abscissa and ordinate evaluations respectively, with indicia to designate said evaluations, a straight edge scale rotatably connected with said chart on a center adjacent to one corner of said chart pivoted at the zero marking points of said chart and arranged to swing across said chart providing means whereby readings may be taken by following the lines from said intersections to other points on said chart and back in essentially parallel lines to appropriate graduations on the scale to obtain arithmetical products in accordance with given values of said selected graduations and intersections, a protractor on said chart having its center at the zero marking points of said chart, a slidable arm on said straight edge scale providing mechanical straight edges for connecting said graduations and intersections, a second double component chart rotatably operable at the zero marking points of the first mentioned chart.

HALLOCK S. MARSH.

REFERENCES CITED

The following references are of record in the file of this patent:

UNITED STATES PATENTS

| Number | Name | Date |
|---|---|---|
| 69,844 | Rutherford | Oct. 15, 1867 |
| 378,257 | Leschorn | Feb. 21, 1888 |
| 435,843 | Leschorn | Sept. 2, 1890 |
| 611,697 | Lundy | Oct. 4, 1898 |
| 811,625 | Edmonds | Feb. 6, 1906 |
| 972,134 | Swett | Oct. 4, 1910 |
| 1,003,857 | Adams | Sept. 19, 1911 |
| 1,043,605 | Kendrick | Nov. 5, 1912 |
| 1,201,334 | Nielsen | Oct. 17, 1916 |
| 1,226,141 | Sterling | May 15, 1917 |
| 1,409,342 | Hendricks | Mar. 14, 1922 |
| 1,644,791 | Pelschenig | Oct. 11, 1927 |
| 1,652,980 | Glass | Dec. 13, 1927 |
| 1,730,852 | Jenny | Oct. 8, 1929 |
| 1,808,981 | Glass | June 9, 1931 |
| 1,854,437 | Wood | Apr. 19, 1932 |
| 2,238,190 | Sawtelle | Apr. 15, 1941 |
| 2,307,584 | Harris | Jan. 5, 1943 |
| 2,350,424 | Smith | June 6, 1944 |
| 2,408,357 | Wolfe | Sept. 24, 1946 |
| 2,408,571 | Mitchell | Oct. 1, 1946 |
| 2,433,249 | Van Sciever | Dec. 23, 1947 |
| 2,465,481 | Reiche | Mar. 29, 1949 |

FOREIGN PATENTS

| Number | Country | Date |
|---|---|---|
| 133,642 | Austria | June 10, 1933 |
| 595,046 | Germany | Mar. 15, 1934 |